UNITED STATES PATENT OFFICE.

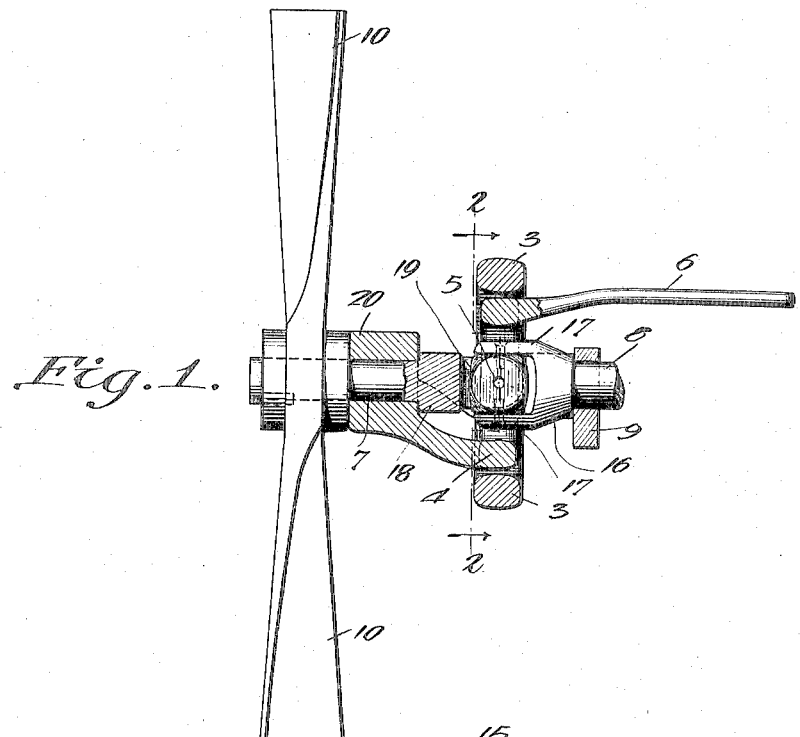
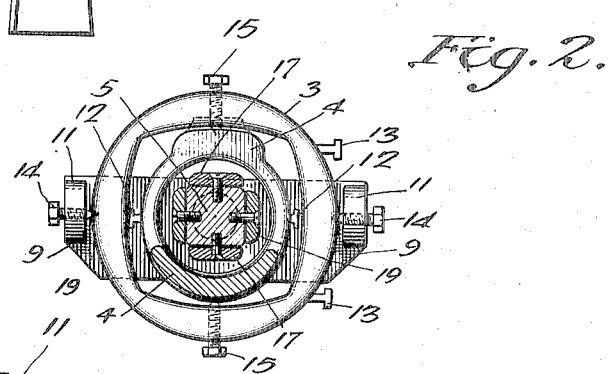
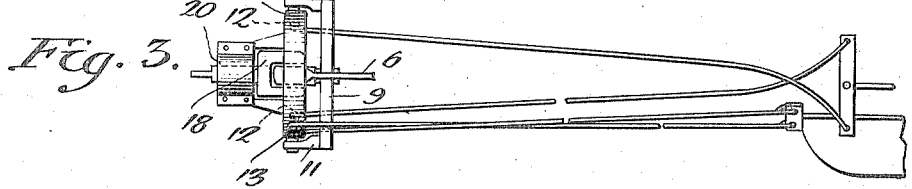

PETER J. SCHELB, OF FORT WORTH, TEXAS.

AIRCRAFT PROPELLING AND MANIPULATING.

1,325,702.   Specification of Letters Patent.   Patented Dec. 23, 1919.

Application filed August 5, 1918. Serial No. 248,500.

*To all whom it may concern:*

Be it known that I, PETER JAY SCHELB, a citizen of the United States of America, residing at Fort Worth, in the county of Tarrant and State of Texas, have invented certain new and useful Improvements in Aircraft Propelling and Manipulating, of which the following is a specification.

My invention relates to improvements in air craft propelling and manipulating for a propeller shaft and other mechanical devices in which one end of the shaft is connected to and controlled by a universal connection and means for supporting and controlling the other end of the shaft and changing the same to different angles.

In air craft propelling and manipulating where the end of the shaft carrying the propeller is to be supported and changed to different angles, there may be also means provided for controlling other devices at the same time for guidance at other parts of the craft working coöperatively with the propeller, and the objects of my invention are:

First. To enable the operator to overcome the now fatal nose dive by providing him with more efficient and simple means for operating and controlling the craft, and second, to enable the craft to be operated more successfully against unfavorable winds and for quick maneuvering in small spaces, etc., and to reduce the number of parts to be manipulated by the operator.

I attain these objects by the mechanism illustrated by the accompanying drawings in which:

Figure 1 is a detail sectional view, broken away from the engine by which the devices are to be driven. Fig. 2 is an end elevation, partly in section, taken substantially along the line 2—2 of Fig. 1. Fig. 3 is a plan view, showing the parts to be automatically actuated by the supporting and controlling members.

Similar characters of reference are used to indicate the same parts throughout the several views.

Only a part of a motor casing 9 is shown with the driving shaft 8 broken away. The end of the shaft 8 is adapted to be screwed into a universal coupling or connection 16 which has coupling jaws 17 and the propeller shaft 7 is connected to a coupling member 18 which has coupling jaws 19. A center piece 5 is provided and the coupling jaws 17 and 18 are pivotally connected to the member 5, the whole making a universal coupling for the propeller shaft 7. The center of the block or member 5 will be a universal center of all operations, as will more clearly appear in further description. Any suitable propeller 10 may be connected to the shaft 7. The propeller shaft 7 is thus connected to a driving shaft 8, whether this shaft 8 is the engine shaft or any shaft driven by a suitable motive power, and the shaft 7 will be driven at whatever angle it may be set or placed.

An adjustable supporting member 3 is provided and this member 3 is pivotally mounted in supporting bearing arms 11 which may extend from the motor casing or other rigid support. The member 3 is connected to the bearing arms 11 by means of axes or pivots 14 so that this member has a swinging or rocking forward and backward motion. The axes 14, if extended, would run through the center of the block or member 5, consequently the center of the member 5 will be the axial center of the member 3. A controlling member 4 is pivotally mounted in the swinging supporting member 3 by means of pivot bolts or axes 15, and the axes 15, if extended would also pass through the center of the block or member 5. Thus the cross center lines of axes 14 and 15 will both pass through the center of the member 5, making the center of the member 5 the center of all operations. The controlling member 4 is thus supported in the adjustable support 3. The propeller 10 is controlled by the member 4 by means of a bearing 20 which is carried by a connection with the controlling member 4. This connection may be made in any suitable manner. I have shown the connection integral with the member 4 and integral with the bearing 20. Any movement of the controlling member 4 will change the direction of the propeller 10. The controller 4 is actuated by an arm 6 which may extend to any place convenient for the operator. Thus by means of the pivotal mounting of the support 3 and the pivotal connection of the member 4 with the support 3, the propeller can be set at any angle or direction desired by means of the arm 6.

The control 4 carries lugs 12 for actuating other operating mechanism and the support 3 carries lugs 13 for actuating other operating mechanism, which will be automatically controlled by the members 3 and 4.

A distinguishing feature of this invention is that the supporting frame, which is substantially a circle or ring, the controlling member 4, and the universal coupling all operate about a common center and in operation these parts never get into a position which does not have this common center.

This invention has been described above as applicable to air crafts. But I do not wish to be understood as limiting my invention to air crafts, as the principle of the mechanical devices described and illustrated may be utilized in other arts.

Various changes in the sizes, proportion, construction, and arrangement of the several parts may be made without departing from my invention.

What I claim, is,—

1. In a device of the character described, the combination of a shaft provided with a universal coupling, of a propeller provided with a shaft operatively connected to said coupling, and controlling mechanism for said propeller consisting of an adjustable supporting member pivotally mounted, a controlling member pivotally mounted within said supporting member and operatively connected with said propeller, and an actuating arm connected to said controlling member.

2. In a device of the character described, the combination of a shaft having a universal coupling, a propeller provided with a shaft operatively connected with said coupling, and controlling mechanism for said propeller consisting of an adjustable supporting member pivotally mounted, a controlling member within said supporting member and pivotally connected thereto, a bearing for said propeller shaft controlled by said controlling member, and means for actuating said controlling member.

3. In a device of the character described, a driving shaft provided with a universal coupling, a propeller provided with a shaft operatively connected with said coupling, a circular supporting member pivotally mounted whose diameter runs centrally through said coupling, and a controlling member pivotally mounted within said supporting member and provided with means for changing the direction of said propeller shaft.

4. In a device of the character described, a driving shaft provided with a universal coupling, a propeller provided with a shaft operatively connected with said coupling, a circular supporting member whose diameter runs centrally through said coupling, supporting pivots or axes for said supporting member in line with the center of said coupling, a circular controlling member mounted within said supporting member, pivots or axes connecting said controlling member to said supporting member in line with the center of said coupling, and means carried by said controlling member for controlling said propeller.

5. In a device of the character described, a driving shaft provided with a universal coupling, a propeller provided with a shaft operatively connected with said coupling, a circular supporting member whose diameter runs centrally through said coupling, pivotal supports or axes for said supporting member in line with the center of said coupling, a circular controlling member mounted within said supporting member, pivotal supports or axes connecting said controlling member to said supporting member in line with the center of said coupling, the supporting axes of said supporting member and said controlling member being at right angles to each other and centering in the center of said coupling, and means by which said supporting member and said controlling member control said propeller and other mechanism.

6. In a device of the character described, a shaft provided with a universal coupling, a propeller operatively connected with said shaft, a controlling mechanism for said propeller including a vertically disposed controlling member, a vertical axis therefor, a supporting extension for the propeller spaced from the cross line of said shaft and said axis and rigidly engaging said controlling member and projected toward said propeller, a bearing for the propeller carried by said supporting extension located between the propeller and the cross line of said axis and said shaft whereby said bearing and propeller swing in unison with said controlling member in a horizontal plane relative to the axis of said controlling member, and means for turning said controlling member.

7. In a device of the character described, a drive shaft provided with a universal coupling, a propeller operatively connected with said coupling, and controlling mechanism for said propeller and other mechanism including an adjustable controlling member provided with actuating lugs and a supporting axis for the controlling member, a bearing for the propeller and a connection rigid with said controlling member and supporting said bearing between the propeller and the line of said axis, and means for actuating said controlling member.

PETER J. SCHELB.